United States Patent Office 3,429,313
Patented Feb. 25, 1969

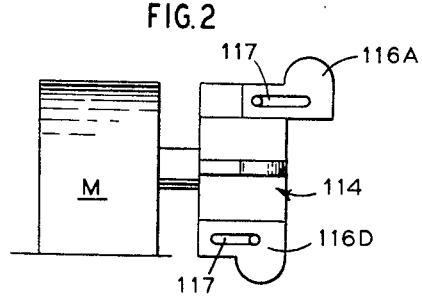
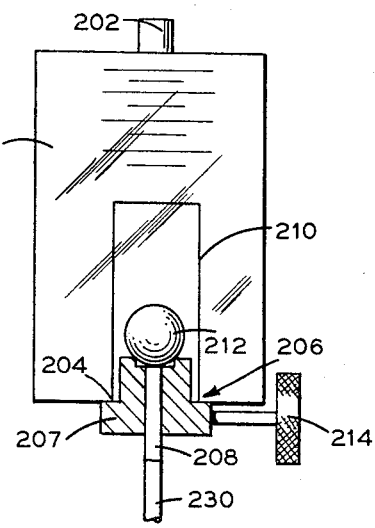
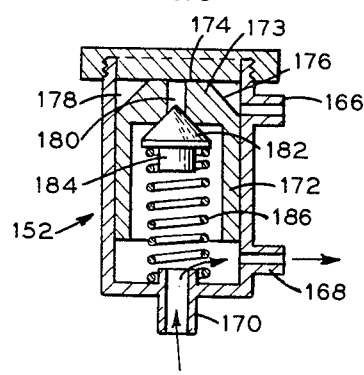
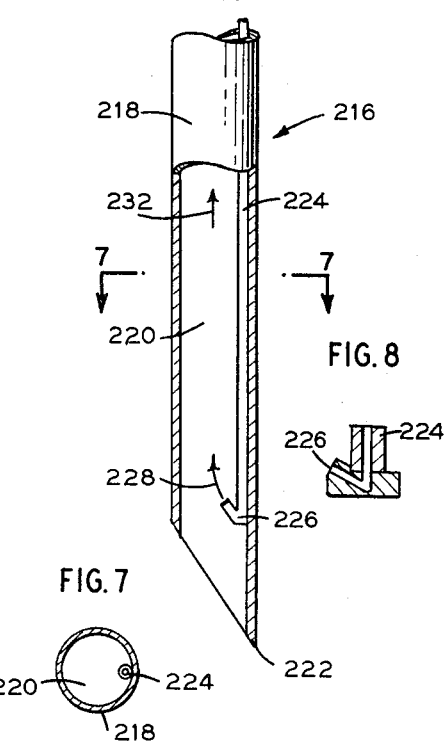
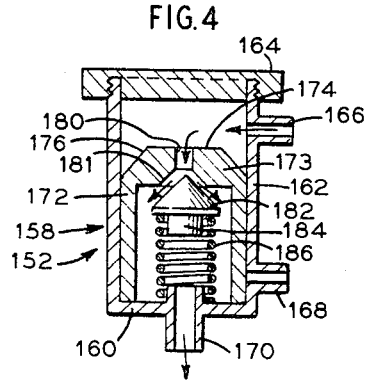
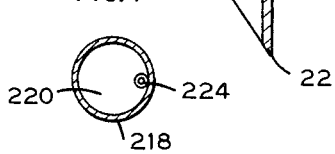

3,429,313
MEDICAL DRAINAGE PUMP
Pat Romanelli, Bronx, N.Y., assignor to Ram Domestic
Products Company, Englewood, N.J., a partnership
Filed Feb. 1, 1966, Ser. No. 524,167
U.S. Cl. 128—276      7 Claims
Int. Cl. A61m *1/00, 5/00, 7/00*

ABSTRACT OF THE DISCLOSURE

A medical drainage system for draining body fluids through a catheter to a collection receptacle, wherein a vacuum pump is connected to the catheter through said receptacle and a separate irrigation system is provided for supplying irrigation fluid continuously or at designated intervals to the catheter to prevent clogging thereof. The irrigation system is operable by air under pressure supplied by the vacuum pump.

---

This invention relates generally to apparatus for draining body fluids, and more particularly pertains to a medical drainage pump permitting a regulated drainage system wherein an irrigation fluid is automatically periodically applied to the catheter to prevent it from becoming clogged or to introduce medication while it is in use.

In utilizing such a system, a catheter, Levine tube, Cantor or Miller-Abbott tube or a similar device is inserted into the body cavity and the catheter is connected to a vacuum pump so that the body fluids are drawn through the catheter into a collection bottle or an appropriate receptacle. However, it has been found that the catheter tends to become clogged with blood, mucous, and other body fluids after a relatively short period of operation. Also, constant suction will temporarily withdraw all available fluid for a short period of time and then the body's cavity or organ will collapse around the catheter openings by the constant suction resulting in a closed system which then becomes inoperable for further drainage of fluid which will subsequently accumulate.

Presently this condition is corrected by periodic disconnection of the apparatus and manual irrigation of the catheter. Following the irrigation the suction apparatus is then reconnected and then there is a short lapse period of no suction, until the pump builds up the vacuum pressure. Because of personnel problems, irrigations are infrequent, time consuming, the amount of irrigating fluid used must be calculated and additional apparatus must be expended. Where sterility is a factor the constant disconnection of the apparatus, manual irrigation and reconnection of the suction device can be a source of contamination.

Accordingly, the principal object of the present invention is to provide apparatus for draining body fluids from a patient wherein the possibility of coagulation of the body fluids to produce an obstruction in the apparatus is eliminated.

Another object of the invention is to provide apparatus for draining body fluids from a body cavity through a catheter wherein an irrigation fluid is forced to flow through the passage in the catheter to prevent the body fluids from blocking the passage.

A further object of the present invention is to provide apparatus of the type described wherein a measured and controlled rate and frequency of flow of the irrigation fluid is maintained at all times.

A further object will be the automatic introduction of medication such as antibiotics, anti-inflammatory drugs, fibrinolydic drugs, etc., into body cavities under sterile conditions.

Other objects and features of the present invention reside in novel constructional details of the apparatus resulting in a body fluid drainage system wherein an alarm is automatically actuated to produce a signal when the fluid drain receptacle is full. Thus, the drained fluid is prevented from flowing into and damaging other parts of the system.

In accordance with the invention, there is provided fluid draining apparatus which includes a catheter, a drainage system and an irrigation system. The drainage and irrigation systems are connected to the catheter and are respectively operable to drain fluids from the body of a patient and to supply an irrigation fluid which prevents the body fluids from coagulating and producing obstructions in the drainage system. As disclosed in detail below, the irrigation fluid may be supplied intermittently at preselected intervals or it may be supplied continuously.

Additional objects and advantages of the present invention will become apparent from a consideration of the following detailed description when taken in conjunction with the accompanying drawings, in which:

FIG. 2 is a side elevational view of the timing mechanism shown in FIG. 1;

FIG. 3 is an enlarged cross-sectional view of the valve structure forming a part of the catheter illustrated in FIG. 1, the valve being shown in the closed position;

FIG. 4 is a cross-sectional view of the valve structure illustrated in FIG. 3, the valve being shown in the open position;

FIG. 5 is a front elevational view, partially in section, of a modified embodiment of a source of irrigation fluid constructed in accordance with the present invention;

FIG. 6 is a front elevational view, to enlarged scale and with parts broken away, of a catheter adapted to be used in conjunction with the source shown in FIG. 5;

FIG. 7 is a sectional view of the catheter taken along the line 7—7 of FIG. 6; and FIG. 8 is an enlarged fragmentary cross-sectional view of the catheter shown in FIG. 6.

Figure 1:
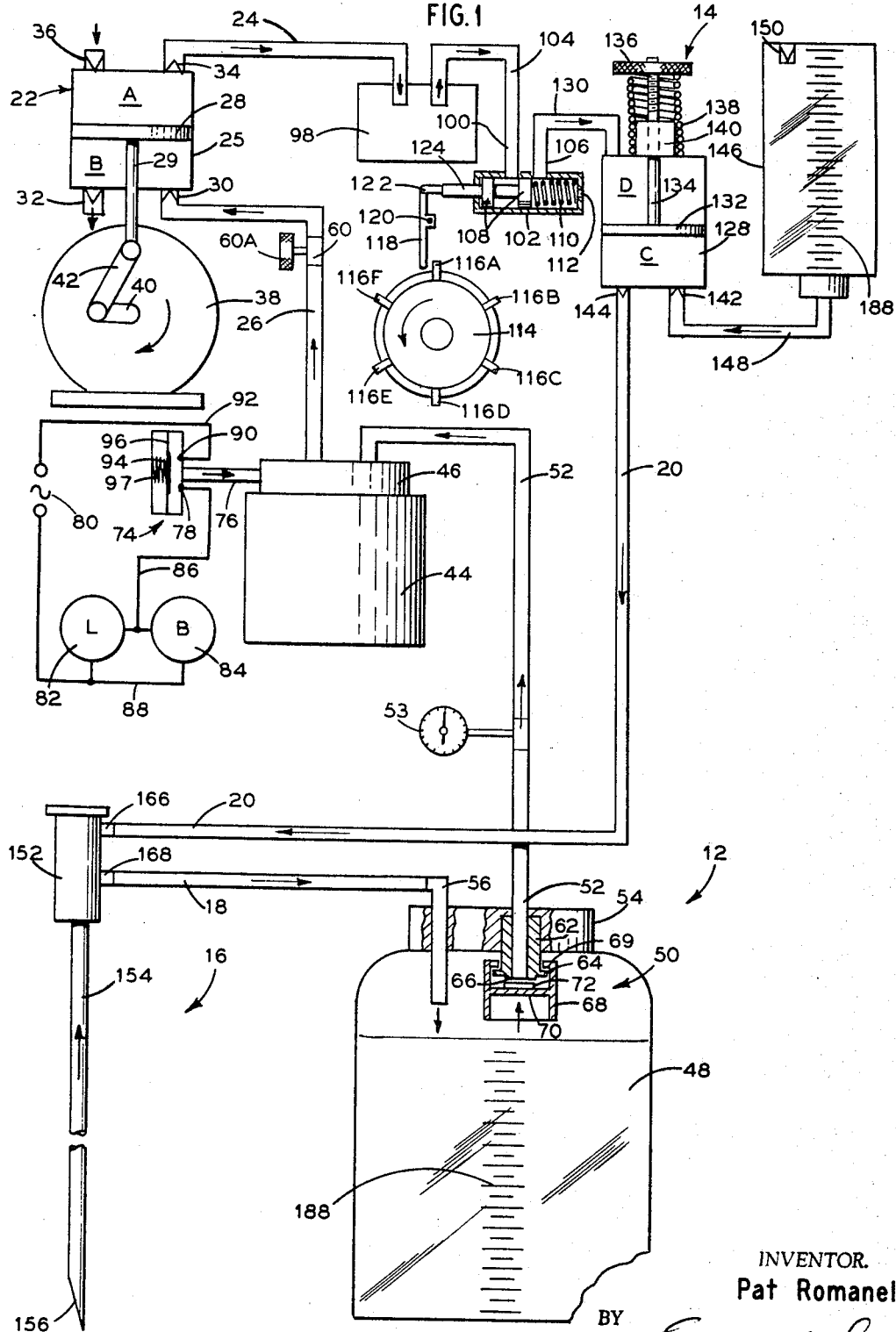
FIG. 1 is a diagrammatic illustration, partially in schematic form of a medical drainage pump system constructed according to the present invention.

A first embodiment of the apparatus of the present invention, shown in FIGS. 1-4, generally comprises a catheter having a novel flow control valve construction, a body fluid drainage system, and an irrigation system. The catheter is adapted to be inserted into a body cavity and the drainage system is operable to apply a vacuum to the catheter to drain the body fluids into an appropriate receptacle. The irrigation system is operable to force a predetermined quantity of irrigation fluid through the catheter at preselected intervals to maintain the catheter free from obstructions which would prevent operation of the drainage system. The flow control valve is adapted to close automatically the vacuum passage in the catheter during the flow of the irrigation fluid. Hence, the possibility of the irrigation fluid flowing directly into the body fluid receptacle instead of traversing the catheter passage is completely eliminated.

Referring in detail to the drawings, there is shown in FIG. 1 a catheter 16 which is connected by a tube 18 to the drainage system of the present apparatus, designated generally by the numeral 12. The catheter 16 is also connected by a tube 20 to the irrigation system portion of the present apparatus, designated generally by the numeral 14. The tubes 18 and 20 are preferably flexible so that the catheter 16 may be easily oriented in any desired position. Thus, the drained body fluids flow into the drainage system 12 through the tube 18 and the irrigation fluid flows from the irrigation system 14 to the catheter through the tube 20.

The drainage system 12 and irrigation system 14 are both actuated by a double-acting pump 22 which applies air under pressure through a tube 24 to the irrigation system 14, and also applies a vacuum through a tube 26 to the drainage system 12. More particularly, the pump 22 includes a piston 28 received in a piston cylinder 25 and dividing the cylinder into two variable volume chambers A and B. A pair of one-way valves 30 and 32 communicate with the chamber B and a second pair of one-way valves 34 and 36 communicate with the chamber A. These one-way valves allow fluid to pass therethrough in the directions indicated thereon and prevent the passage of fluid in the opposite directions.

As the piston 28 moves upwardly in the cylinder 25, the volume of chamber 8 increases and the volume of chamber A decreases. The one-way valves 30 and 34 are so arranged that in such upward movement of piston 28, air is drawn through the valve 30 thereby producing a vacuum in the tube 26 and air is forced through the valve 34 under pressure to the tube 24. Moreover, the valves 32 and 36 are so arranged that no air flows therethrough when the valves 30 and 34 are open. However, when the piston 28 descends in the cylinder, air is sucked into chamber A through the valve 36 and air is exhausted from chamber B to the atmosphere through the valve 32. The valves 30 and 34 prevent the flow of air therethrough during the down stroke of the piston 28.

Movement of the piston 28 is effected by a motor 38, the output shaft of which is connected to the piston rod 29 of piston 28 by links 40 and 42. Thus, the rotational motion of the output shaft of the motor 38 is converted into a reciprocating motion of the piston 28 by the links 40 and 42 to operate the pump 22.

The tube 26 communicates with the outlet side of a filter 44 through an airtight cover 46. The inlet side of filter 44 is connected by a tube 52 to a vacuum gauge 53, which indicates rate of flow, and then to the interior of a receptacle 48 in the form of a graduated glass jar. The tube 52 passes through an airtight cover 54 on receptacle 48 and opens into the interior of the latter through a check-valve mechanism 50 secured to the interior of cover 54. A manually adjustable regulating valve 60 is interposed in the tube 26 and is controlled by a knob 60A which may be turned to vary the valve opening and thereby control the rate of flow of air through the tube 26.

A tubular inlet fitting 56 also extends through the airtight cover 54 and is connected to the catheter tube 18 in communication therewith for supplying body fluid to the receptacle 48, in a manner to be presently described.

The check-valve mechanism 50 includes a collar 62 secured to and depending from cover 54, and the collar 62 having a radial flange 64 adjacent its bottom surface 66. The tube 52 extends through the center of collar 62, opening through said bottom surface 66. A cylindrical bell float 68 is mounted on collar 62 by means of an inwardly-directed annular flange 69 which overlies the flange 64 to prevent separation of the bell float from collar 62. The float 68 is also provided with an intermediate transverse wall or web 70 having a projection 72 on its upper surface. The projection 72 is positioned to engage the bottom surface 66 of collar 62 to seal off the end of tube 52.

The cover 54 may be attached to the receptacle 48 by any conventional means, such as the conventional and commercially available quick clamp devices, to provide an airtight seal therebetween.

The filter 44 also communicates with a pressure responsive electrical switch 74 by means of a tube 76. One contact 78 of the switch 74 is connected to one terminal of a source of potential 80 through the parallel connection of a lamp 82 and a bell 84 by leads 86 and 88. The other contact 90 of the switch 74 is connected to the opposite terminal of the electrical power source 80 by a lead 92. The contacts 78 and 90 are adapted to be bridged by a conducting plate 94 carried by a movable diaphragm 96 in the switch body. A spring 97 normally biases the diaphragm 96 to a position wherein the plate 94 is in spaced relation to the contacts 78 and 90. However, when the vacuum in the tube 76 increases, in the manner described below, the diaphragm is drawn toward the contacts until the plate 94 connects contact 78 with contact 90 and thus, connects the source 80 across the bell 84 and lamp 82 to energize the same.

Reference is now made to the irrigation system 14 which, as previously indicated, suplies an irrigation fluid to the catheter 16 to prevent clogging thereof. Specifically, the irrigation system 14 includes a filter 98, the inlet side of which is connected by tube 24 to a chamber A of pump 22 through valve 34. The outlet side of the filter 98 is connected by a tube 104 to the inlet port 100 of a spool valve 102. The spool valve 102 includes longitudinally spaced inlet and outlet ports 100 and 106, respectively, and longitudinally spaced pistons 108. The pistons 108 are biased toward the left, as viewed in FIG. 1, by a compression spring 110 so that the inlet and outlet ports 100, 106 are normally sealed off from each other and the outlet port 106 communicates with an aperture 112 in the end wall of the valve 102. However, the pistons 108 may be shifted longitudinally to the right so that the inlet port 100 communicates with the outlet port 106 and the passage between the port 106 and the aperture 112 is sealed.

Movement of the pistons 108 is effected by a timing mechanism which includes a wheel designated generally by the numeral 114 in FIG. 1 and shown in detail in FIG. 2. The wheel 114 is connected to the output shaft of a motor M which may, for example, produce one revolution of the wheel 114 each hour. A plurality of cams 116A–116F are slidably mounted on the wheel 114 and spaced about the circumference thereof. As shown in FIG. 2, those cams are each slidably mounted by pin and slot arrangement 117 and may be moved inwardly to an operating position, such as cam 116D in FIG. 2, or the cams may be moved outwardly to an inoperative position, such as cam 116A. Positioned above the wheel 114, in the path of the cams in the operating position, is a lever 118, shown in FIG. 1, said lever being pivotally mounted on a support structure (not shown) by a pivot pin 120. The lever 118 carries at its upper end a laterally-projecting arm 122 engaging a stem 124 mounting the pistons 108. Accordingly, as the wheel 114 rotates in the direction indicated by the arrow 126, the cams 116A–116F in the operating position sequentially pivot lever 118 about the pin 120, thereby shifting the pistons 108 to the right so that the inlet port 100 and the outlet port 106 of the valve 102 are in communication with each other. The timing cycle of the operation of the valve 102 may be selectively adjusted by simply moving various selected cams 116A–116F into and out of the operating position.

The irrigation system 14 further includes injection pump 128 which is connected to the outlet port 106 by a tube 130. More specifically, the pump 128 is divided into a bottom chamber C and an upper chamber D by a movable piston 132. The upper chamber D communicates with the valve 102 through the tube 130. The piston 132 is carried by a piston rod 134 which is threaded at its upper end to receive a threaded adjustment wheel 136. A spring 138 encircles the rod 134 and abuts the upper surface of the pump 128 and the lower surface of the wheel 136 to bias the piston 132 to a position spaced from the bottom wall of the pump. The adjustment wheel 136 is adapted to engage the upper surface of a bushing 140 on the upper surface of the pump cylinder to limit the downward movement of the piston 132. Thus, the capacity of the chamber C may be varied by rotating the adjustment wheel 136 to change the effective length of stroke of the piston 132.

Communicating with the chamber C is a one-way inlet valve 142 and a one-way outlet valve 144. The outlet valve 144 is connected to the catheter 16 by the tube 20. The inlet valve 142 is connected by tube 148 to a source of irrigation fluid such as reservoir 146. An inlet valve 150 is provided at the top of the reservoir 146 to allow the entrance of air as the fluid is drawn out of the reservoir.

The catheter 16 includes a valve portion 152 to which the tubes 18 and 20 are connected, and a depending hollow needle portion 154. The needle 154 is provided with a central passage which communicates with the valve 152, and an inclined bottom opening 156 terminating in a pointed tip to facilitate the insertion of the catheter into a body cavity. The valve 152 is operable to selectively connect either the drainage system 12 or the irrigation system 14 with the needle 154 thereby to eliminate the possibility of the irrigation fluid being drawn into the drainage system before it has circulated through the body cavity.

The valve 152 is shown in detail in FIGS. 3 and 4. In FIG. 3, the valve is in a position for draining, while in FIG. 4 the valve is in position to irrigate. Said valve 152 includes a cylindrical housing 158 having a bottom wall 160, a side wall 162, and a top cover portion 164 threaded on the side wall 162 and providing an airtight cover for the housing 158. The side wall 162 is formed with radially-projecting, vertically-spaced nipples 166 and 168 having through bores therein which communicate with the interior of housing 158. The nipples 166 and 168 are adapted to mount the respective tubes 20 and 18 in airtight communication therewith. An integral bushing 170 depends from the bottom wall 160 of valve 152 and is provided with a through control passage. The lower portion of the bushing 170 is sized for reception in the central passage of the needle 154 in tight frictional engagement therewith.

A hollow inverted cup 172 is slidably received in the housing 158. The cup 172 has a truncated top end 173 presenting a flat top surface 174 and an inclined annular surface 176. In the normal elevated position of the cup 172 shown in FIG. 3, the flat top surface is in flush abutment with the inner surface of cover 164 and the annular surface 176 forms with the housing walls 162 and 164 a continuous circular chamber 178 which communicates with the through bore of nipple 166.

The top end 173 of cup 172 has a central through bore 180 communicating with an enlarged conical valve seat 181 which receives a correspondingly-shaped valve head 182 for sealing off bore 180. The conical valve head 182 has an integral stem 184 which seats one end of a compression spring 186. The other end of spring 186 is seated on the upper end of bushing 170 and tension of said spring 186 biases the valve head 182 into sealing engagement with the valve seat 181. Spring 186 also normally urges the cup 172 to its elevated position of FIG. 3. In this position, the bore in nipple 170 is in communication with the bore nipple 168 through the interior of housing 158, to permit drainage of body fluids therethrough from the catheter, but the bore in nipple 166 is sealed off from the passage of such fluid.

The cup 172 may be moved to the lowered position of FIG. 4 wherein its lower end seals off the bore in nipple 168, thereby shutting off communication between the valve 152 and the receptacle 48. At the same time, the bore in nipple 166 is brought into communication with the uncovered bore 180 in cup 172. The cup 172 is brought to the lowered position by action of the injection pump 128, which, when energized, pumps irrigation fluid under pressure through tube 20 and nipple 166 into the annular chamber 178 surrounding the top of cup 172. The pressure of this irrigation fluid in chamber 178 is greater than the biasing force of spring 186 and therefore forces the cup 172 to its lowered position of FIG. 4. At the same time, the pressure of the irrigation fluid forces the valve head 182 downwardly out of valve seat 181 so that the irrigation fluid flows through bore 180 into the interior of cup 172 and through the bore in bushing 170 to the catheter.

It will be understood that in practice the various connecting tubes referred to above are preferably flexible to permit a wide variety of installations and versatility of use.

In operation, the timing cams 116A–116F on the wheel 114 are adjusted so that irrigation fluid is injected into the catheter 16 at desired intervals. Additionally, the adjustment wheel 136 is rotated so that the capacity of chamber C of the injection pump 128 supplies the desired volume of irrigation fluid to the catheter. The motor 38 is energized to actuate the pump 22. Thus, air under high pressure is supplied to the inlet port 100 of spool valve 102 through the tubes 24 and 104 and filter 98, and a vacuum exists in the tube 26. Lever 118 is manually pivoted to operate the valve spool 102 and connect the inlet port 100 with the outlet port 106. Accordingly, air under pressure enters chamber D of the pump 128 through the tube 130, and forces the piston 132 downwardly. Thus, air is forced out of the chamber C into the tube 20. The lever 118 is released and valve 102 returns to its normally closed position under bias of the spring 110. Spring 138 causes the piston 132 to return to its normal position and the air in chamber D is exhausted to the atmosphere through the tube 130, port 106 and aperture 112. On the return stroke of the piston 132, irrigation fluid is sucked into chamber C from the reservoir 146, through the tube 148 and the valve 142. Accordingly, the apparatus is now primed for use. The catheter 16 is inserted into the body cavity in the normal manner.

Initially, the catheter valve 152 will be in the position shown in FIG. 3 wherein the bore in the nipple 168 and the passage in the bushing 170 are in communication with each other. The vacuum existing in the tube 26 is transmitted to the central passage in the needle 154 through the filter 44, tube 52, receptacle 48, tube 18, and valve 152. Thus, body fluids will be drained through the catheter 16 and tube 18 into the receptacle 48. The rate of flow of the body fluids is controlled by the valve 60 which is operated by knob 60A.

When one of the timing cams 116A–116F engages the lever 118, the piston 132 of the injector pump 128 is caused to move down, in the manner noted above. As the piston moves downwardly, irrigation fluid is forced into the tube 20 and through the valve 152. This action increases the pressure in the tube 30 thereby increasing the pressure on the inclined surface 176 of the cup 172 of valve 152 (FIGS. 3 and 4). Thus, the cup 172 is forced down to the lower position, thereby sealing the bore in the nipple 168. Further increase in pressure of the irrigation fluid in the chamber 178 unseats the piston head 182 thereby opening the passage 180. Hence, the irrigation fluid will flow in through the passage 180 and out through the passage in the bushing 170 and, therefore, through the needle 154 to prevent the body fluids from coagulating or otherwise blocking the catheter 16.

When the timing cam rotates beyond the lever 118, the valve 102 closes and the piston 132 returns to its normal position thereby allowing more irrigation fluid to enter the chamber C to replace the fluid expelled. Hence, the pressure in the tube 144 decreases and the cup 172 of valve 152 returns to the upper position shown in FIG. 3. The one-way valve 144 prevents back-flow of fluid from the tube 20. Thus, the body fluids are again drained into the receptacle 48 along with the irrigation fluid which may be in the body cavity following an irrigation cycle. The reservoir 146 and the receptacle 48 may be provided with graduations 188 so that the exact amount of body fluids drained may be determined by subtracting the amount of irrigation fluid used from the amount of fluid in the receptacle.

When the level of the fluid in the receptacle reaches the float 68, the float rides up on the collar 62 until the projection 72 on the wall 70 engages the bottom surface 66 and seals off the tube 52. This action substantially increases the vacuum in the tube 52 thereby causing the diaphragm 96 in the switch 74 to move toward the contacts 78, 90, until the plate 94 connects the contacts. Thus, the lamp 82 and the buzzer or bell 84 will be energized to notify the operator that the receptacle is full and must be changed. Additionally, it is to be noted that the lamp 82 and audio alarm 84 provide a notice to the operator in the event that any of the parts of the drainage system become clogged for any reason whatsoever.

Accordingly, a novel medical drain pump apparatus has been disclosed for draining body fluids from a body cavity wherein an irrigation fluid is periodically applied to a catheter at preselected intervals to prevent the apparatus from becoming clogged while it is in operation.

In many instances it is undesirable to circulate an irrigation fluid directly into a body cavity. For example, a patient may be allergic to the fluid and suffer violent reactions therefrom. Thus, FIGS. 5, 6 and 7 illustrate a modified embodiment of the present invention wherein the irrigation fluid does not flow into the body cavity. FIG. 5 shows a source of irrigation fluid in the nature of reservoir 200 which includes a nipple 202 adapted to receive the tube 104 of FIG. 1 thereon. Accordingly, air under pressure will be applied to the reservoir 200 in the manner noted above. The reservoir 200 is provided with a bottom opening 204 which receives a combination valve and float mechanism 206 therein. The mechanism 206 includes a stopper 207 having a tube 208 extending therethrough and beyond the lower surface thereof and communicating with the interior of the irrigation fluid reservoir 200. A cage 210 surrounds the opening 204 and contains a ball float 212 adapted to seal the passage in the tube 208. The ball 212 is normally spaced above the stopper 207, but when the irrigation fluid is exhausted, the ball 212 rests on and seals the tube 208 to prevent air from entering the system. This arrangement may also be used advantageously in the reservoir 146 of FIG. 1 to operate in a similar manner for preventing air from entering the system of FIG. 1. A knob 214 controls the setting of the valve portion (not shown) of the mechanism 206 to obtain a predetermined rate of flow of the irrigation fluid.

A catheter adapted to be used in conjunction with the reservoir 200 is shown in FIGS. 6–8 and is designated generally by the numeral 216. The catheter 216 comprises a needle 218 having a central through bore 220 and a pointed end 222. Extending along the inner wall of the needle 218 is a tube 224 which terminates in an upturned end section 226 spaced above the bottom opening of the needle so that the irrigation fluid leaving the tube 224 will be directed upwardly as indicated by the arrow 228. The tube 224 is connected to the irrigation fluid reservoir 200 by a suitable coupling such as flexible tube 230. It will now be appreciated that the reservoir 200 will apply a continuous flow of irrigation fluid to the catheter 216; the rate of flow of the fluid being determined by the setting of the knob 214. Additionally, the flow of the body fluids through the bore 220 will be in direction indicated by the arrow 232. Thus, the irrigation fluid exiting from the end 226 of the tube 224 will be injected into the flow of the body fluids and will similarly be carried to the receptacle 48. Thus, the path that the irrigation fluid traverses will be kept clear of obstructions and, since the irrigation fluid is directed directly into the flow of the body fluids, none of the fluids will enter the body of the patient.

While preferred embodiments of the invention have been shown and described herein it will be obvious that numerous omissions, changes and additions may be made in such embodiments without departing from the spirit and scope of the invention.

What I claim is:

1. Apparatus for draining body fluids from a person comprising a single pump means having a pressure outlet supplying air under pressure and a suction outlet creating a vacuum, a catheter having a central passage and a bottom opening, and being adapted to be inserted into a cavity in the body, a reservoir for the reception and retention of body fluids drained by said catheter, first conduit means connecting the suction outlet of said pump mens with said reservoir and connecting said reservoir with said catheter to provide a closed drainage system for the transmission of body fluid from said catheter to said reservoir, a source of catheter irrigation fluid, and second conduit means connecting said pressure outlet of said pump means with said source and connecting said source with said catheter to provide a closed irrigation system for the transmission of irrigation fluid under pressure to said catheter, said second conduit means including adjustable control means between said source and said catheter and being operable to regulate the amount of irrigation fluid supplied to said catheter.

2. Apparatus for draining body fluids according to claim 1, wherein said irrigation fluid is supplied continuously to said catheter and wherein the central passage in said catheter communicates with said first conduit means, and said catheter includes a tube received in said central passage and terminating above the bottom opening thereof and being connected to said control means, whereby the irrigation fluid from said source flows through the tube into said central passage to irrigate said central passage as body fluids are drawn up through the latter.

3. Apparatus for draining body fluids according to claim 2, said tube terminating in an upwardly extending end portion for directing the irrigation fluid upwardly in said central passage to prevent the irrigation fluid from flowing out of said bottom opening into the body cavity.

4. Apparatus for draining body fluids according to claim 1 in which said irrigation system includes a valve in said second conduit means normally interrupting communication between said pump means and said source of irrigation fluid, and timing means for periodically actuating said valve to establish a period of communication between said pump means and said source, whereby said irrigation fluid is applied to said catheter at preselected intervals.

5. Apparatus according to claim 4 which also includes valve means in said catheter operable in response to the pressure of said irrigation fluid to interrupt communication between said first conduit means and said catheter.

6. Apparatus for draining body fluids from a person comprising pump means for creating a vacuum, a catheter having a central passage and a bottom opening, and being adapted to be inserted into a cavity in the body, conduit means connecting said pump means with said catheter to provide a closed drainage system for the transmission of fluid therethrough, said system including a reservoir for the reception of the body fluids, a source of catheter irrigation fluid, control means connecting said source with said catheter and being operable to regulate the amount of irrigation fluid supplied to said catheter, and timing means for periodically actuating said control means to apply irrigating fluids to said catheter at preselected intervals, said catheter including valve means movable between a first position wherein said valve means provides a path between said central passage and said conduit means, and a second position wherein said valve means provides a path between said control means and said central passage; said valve means being responsive to a predetermined pressure of irrigation fluid applied to said catheter to move from the first to the second position; and biasing means for biasing said valve means to the first position.

7. Apparatus for draining body fluids from a person comprising pump means for creating a vacuum, a catheter having a central passage and a bottom opening, and being adapted to be inserted into a cavity in the body, conduit means connecting said pump means with said catheter to provide a closed drainage system for the transmission of fluid therethrough, said system including a reservoir for the reception of the body fluids, a source of catheter irrigation fluid, control means connecting said source with said catheter and being operable to regulate the amount of irrigation fluid supplied to said catheter, and timing means for periodically actuating said control means to apply irrigating fluids to said catheter at preselected intervals, wherein said control means includes a housing having bottom and side walls, a piston in said housing, means for selectively spacing the piston from the bottom wall by a preselected distance to define a chamber having a variable volume, inlet means in said bottom wall connected to said source of irrigation fluid and outlet means in said bottom wall connected to said catheter, and means connecting said housing with said timing means for operation of said piston, whereby said timing means causes depression of said piston at preselected intervals to force irrigation fluid out of said outlet means into said catheter, said piston causing irrigation fluid to fill said chamber upon the return stroke.

References Cited

UNITED STATES PATENTS

| | | | |
|---|---|---|---|
| 1,209,846 | 12/1916 | Kells | 128—276 |
| 1,355,727 | 10/1920 | Aprile | 128—240 |
| 1,846,596 | 2/1932 | Hertzberg | 128—227 |
| 2,492,384 | 12/1949 | Kaslow | 128—240 |
| 2,494,088 | 1/1950 | Dulity | 128—240 |
| 3,016,055 | 1/1962 | Oldenburg | 128—278 |
| 3,042,042 | 7/1962 | Blanck | 128—276 |
| 3,109,426 | 11/1963 | Noonan et al. | 128—240 |
| 3,142,298 | 7/1964 | Koski et al. | 128—276 |

CHARLES F. ROSENBAUM, *Primary Examiner.*

U.S. Cl. X.R.

128—230, 240